United States Patent [19]

Takashima

[11] Patent Number: 5,703,516
[45] Date of Patent: Dec. 30, 1997

[54] OFFSET CANCEL CIRCUIT AND OFFSET CANCEL SYSTEM USING THE SAME

[75] Inventor: Sumihiro Takashima, Tokyo, Japan

[73] Assignee: Oko Electric Industry Co., Ltd., Tokyo, Japan

[21] Appl. No.: 623,901

[22] Filed: Mar. 27, 1996

[30] Foreign Application Priority Data

Jun. 13, 1995 [JP] Japan .................. 7-146252

[51] Int. Cl.$^6$ ............................................ H03L 5/00
[52] U.S. Cl. ........................................ 327/307; 327/362
[58] Field of Search .................. 327/307, 65, 66, 327/67, 362, 538, 542, 543, 560, 561, 562, 563, 51

[56] References Cited

U.S. PATENT DOCUMENTS

| | | | |
|---|---|---|---|
| 5,047,665 | 9/1991 | Burt | 327/307 |
| 5,327,099 | 7/1994 | Fergus | 327/65 |
| 5,539,779 | 7/1996 | Nagahori | 327/307 |

FOREIGN PATENT DOCUMENTS

A-0 367 927   5/1990   European Pat. Off. ......... G01D 3/02

OTHER PUBLICATIONS

Patent Abstracts of Japan, vol. 13, No. 379, 22 Aug. 1989, and JP-A-01 129832 (Citizen Watch Co. Ltd.) 23 May 1989, *Abstract*.

*Primary Examiner*—Toan Tran

[57] ABSTRACT

An offset cancel circuit includes two terminals, an output terminal and two intermediate nodes. When the offset cancel circuit is in a first state, the offset cancel circuit supplies a potential difference responsive to a difference in potential between the two terminals between the two intermediate nodes and supplies a potential responsive to both the potential difference supplied between the two intermediate nodes and a first potential to the output terminal. On the other hand, when the offset cancel circuit is in a second state, the offset cancel circuit supplies a potential difference responsive to the difference in potential between the two terminals between the two intermediate nodes and supplies a potential responsive to both the potential difference supplied between the two intermediate nodes and a second potential to the output terminal.

5 Claims, 2 Drawing Sheets

OFFSET CANCEL CIRCUIT AND OFFSET CANCEL SYSTEM USING THE SAME

BACKGROUND OF THE INVENTION

1. Field of the Invention

This invention relates to an offset cancel circuit for canceling an offset voltage of a pressure sensor or the like and to an offset cancel system using it.

2. Description of the Related Art

An offset cancel circuit comprises a preamplifier unit and a level shifting unit. The preamplifier unit is electrically connected to a device for outputting a small potential difference, such as a pressure sensor or the like. The preamplifier unit serves as a circuit for receiving the small potential difference therein, amplifying it and outputting the amplified potential difference therefrom. The level shifting unit serves as a circuit for outputting a potential responsive to a reference potential settable to a desired level and the amplified potential difference to an AD converter. Thus, the level shifting unit sets the potential outputted to the AD converter so as to fall within the range of input standards of the AD converter.

Operations of the offset cancel circuit and a system using the offset cancel circuit will now be described.

A potential difference outputted from the pressure sensor is first regarded as X1. Next, the potential difference X1 is supplied to an input terminal of the preamplifier unit. At this time, an output potential Y1 supplied to an output terminal of the level shifting unit satisfies the relations in $Y1 = a \cdot X1 + bA + c$ (where a and b: coefficients and A: reference potential). The preamplifier unit and the level shifting unit are respectively composed of a plurality of operational amplifiers. Further, each of the operational amplifiers has an offset voltage. Symbol c indicates a term that will result from the offset voltage. The AD converter receives the Y1 therein and converts the analog value Y1 into a digital value Y3, which is in turn outputted to an arithmetic device.

Next, a potential difference "0" is supplied to the input terminal of the preamplifier unit. At this time, an output potential Y2 supplied to the output terminal of the level shifting unit meets the relations in $Y2 = a \cdot 0 + bA + c = bA + c$. The AD converter receives the Y2 therein and converts the analog value Y2 into a digital value Y4, followed by output to the arithmetic device.

The arithmetic device actually performs an arithmetic computation on Y3−Y4 based on the Y3 and Y4 obtained previously. For simplicity of illustration, however, a description will be made below on the assumption that the arithmetic device performs an arithmetic computation of Y3−Y4=Y1−Y2 (because Y3−Y4 is associated with Y1−Y2).

The arithmetic device calculates Y1−Y2 so as to obtain a potential difference $Y1 - Y2 = a \cdot X1$. As a result, the potential difference irrelevant to the offset voltage of each operational amplifier can be obtained.

However, the pressure sensor or the like for supplying the small potential difference to the preamplifier unit also includes an offset voltage. Thus, since an output error "e" called offset output is produced, an output potential difference X1 of the pressure sensor becomes d+e instead of ideally becoming "d" when the pressure sensor is under a given pressure level. As a result, $Y1 = a \cdot (d+e) + bA + c$ and $Y2 = a \cdot 0 + bA + c$. From both equations, Y1−Y2 becomes $a(d+e)$ (=a·d+a·e). Accordingly, the term a·e based on the offset output of the pressure sensor appears at an output node of the level shifting unit. The offset voltage varies according to products. Correspondingly, the output error e also varies according to the products. It was therefore necessary to adjust the output error e.

SUMMARY OF THE INVENTION

With the foregoing in view, it is therefore an object of the present invention to adjust an offset output derived from an offset voltage varied according to products such as a pressure sensor, etc. connected to a preamplifier unit.

In accordance with one aspect of the present invention, an offset cancel circuit includes two input nodes to which first and second potentials are supplied in a first period from a device having an offset voltage, and to which third and fourth potentials are supplied in a second period. The first potential differs from the second potential, while the third potential is substantially the same as the fourth potential. An output node is also provided.

An amplifier circuit has inputs and outputs, the inputs being electrically coupled to the two input nodes. The amplifier circuit provides fifth and sixth potentials in the first period in response to the first and second potentials, and it provides seventh and eighth potentials in the second period in response to the third and fourth potentials. A level shifting unit has inputs, an output and a level shifting node, the inputs of the level shifting unit being electrically coupled to the outputs of the amplifier circuit, the output of the level shifting unit being electrically coupled to the output node. The level shifting unit supplies in the first period a ninth potential to the level shifting node in response to a first level of a mode changing signal. The level shifting unit supplies in the first period a tenth potential in response to the fifth, sixth and ninth potentials, and it supplies in the second period an eleventh potential to the level shifting node in response to a second level of the mode changing signal. The level shifting unit outputs in the second period a twelfth potential in response to the seventh, eighth and eleventh potentials, wherein the ninth potential differs from the eleventh potential.

According to another aspect of the present invention, an offset cancel system includes two input nodes to which first and second potentials are supplied in a first period from a device having an offset voltage, and to which third and fourth potentials are supplied in a second period, the first potential differing from the second potential, the third potential being substantially the same as the fourth potential. An output node is also provided.

An amplifier circuit has inputs and outputs, the inputs of the amplifier circuit being electrically coupled to the two input nodes. The amplifier circuit provides fifth and sixth potentials in the first period in response to the first and second potentials, and it provides seventh and eighth potentials in the second period in response to the third and fourth potentials. A level shifting unit has inputs, an output and a level shifting node, the inputs of the level shifting unit being electrically coupled to the outputs of the amplifier circuit. The output of the level shifting unit is electrically coupled to the output node. The level shifting unit supplies in the first period a ninth potential to the level shifting node in response to a first level of a mode changing signal, and it provides in the first period a tenth potential in response to the fifth, sixth and ninth potentials. The level shifting unit supplies in the second period an eleventh potential to the level shifting node in response to a second level of the mode changing signal, and it provides in the second period a twelfth potential in response to the seventh, eighth and eleventh potentials, wherein the ninth potential differs from the eleventh potential. An AD converter is electrically connected to the output node for outputting a first value in response to the tenth potential and outputting a second value in response to the twelfth potential. An arithmetic device is electrically connected to the AD converter for performing computation in response to the first and second value.

According to a further aspect of the present invention, a method for adjusting an offset voltage includes the steps of supplying, in a first period, first and second potentials provided from a device having an offset voltage to inputs of an amplifier circuit, with the first potential differing from the second potential. In the first period, third and fourth potentials are output in response to the first and second potentials by the amplifier circuit. In the first period, a fifth potential is supplied to a level shifting node of a level shifting unit in response to a first level of a mode changing signal by said level shifting unit. In the first period, a sixth potential it output in response to the third, fourth and fifth potentials by the level shifting unit.

In a second period, seventh and eighth potentials are supplied to the inputs of the amplifier circuit, the seventh potential being substantially the same as said eighth potential. In the second period, ninth and tenth potentials are output in response to the seventh and eighth potentials by the amplifier circuit. In the second period, an eleventh potential is supplied to the level shifting node of the level shifting unit in response to a second level of the mode changing signal by the level shifting unit, said fifth potential differing from said eleventh potential. In the second period, a twelfth potential is output in response to the ninth, tenth and eleventh potentials by the level shifting unit. A first value is output in response to the sixth potential and a second value is output in response to the twelfth potential. A computation is performed in response to the first and second values.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

DETAILED DESCRIPTION OF THE PREFERRED EMBODIMENTS

Figure 1:
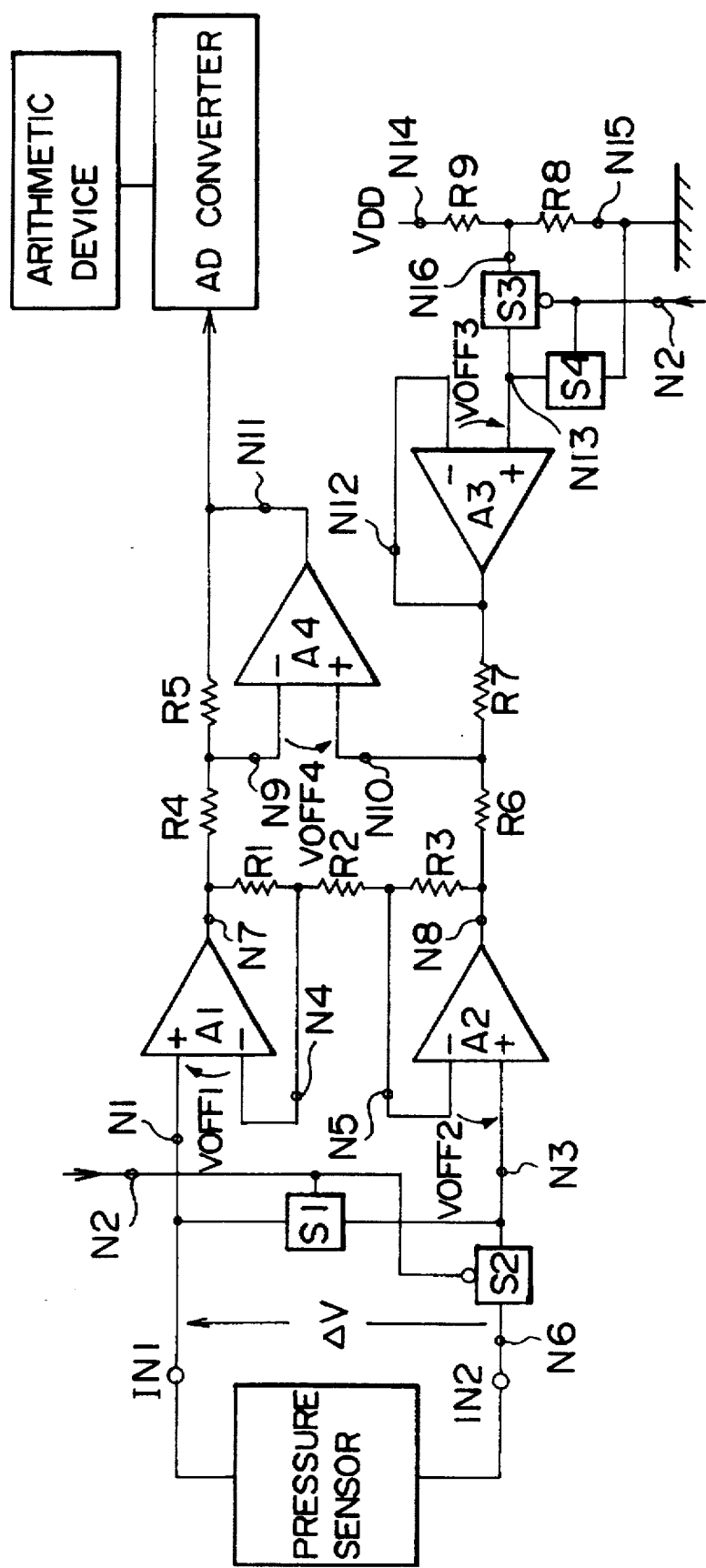
FIG. 1 is a view showing a circuit configuration of an offset cancel system including an offset cancel circuit according to a first embodiment of the present invention.

Preferred embodiments of the present invention will hereinafter be described with reference to the accompanying drawings.

A first embodiment will be described below with reference to FIG. 1.

Symbols N1 through N16 indicate nodes respectively. Symbols A1 through A4 indicate Operational Amplifiers (hereinafter called "Op amps") respectively. Symbols S1 through S4 designate analog switches respectively. Symbols R1 through R8 indicate resistors respectively. Symbol R9 designate a variable resistor. One of output terminals of a pressure sensor is electrically connected to an input terminal IN1, whereas the other thereof is electrically connected to an input terminal IN2. The node N1 is electrically connected to the input terminal IN1, a positive input (hereinafter called "non-inverting input") of the Op amp A1 and one analog input/output of the analog switch S1. The node N2 is electrically connected to control inputs of the analog switches S1, S2, S3 and S4. The node N3 is electrically connected to one analog input/output of the analog switch S2 and a non-inverting input of the Op amp A2. The node N4 is electrically connected to a negative input (hereinafter called "inverting input") of the Op amp A1, one end of the resistor R1 and one end of the resistor R2. The node N5 is electrically connected to an inverting input of the Op amp A2, one end of the resistor R3 and the other end of the resistor R2. The node N6 is electrically connected to the input terminal IN2 and the other analog input/output of the analog switch S2. The node N7 is electrically connected to the output of the Op amp A1, the other end of the resistor R1 and one end of the resistor R4. The node N8 is electrically connected to the output of the Op amp A2, the other end of the resistor R3 and one end of the resistor R6. The node N9 is electrically connected to the other end of the resistor R4, one end of the resistor R5 and an inverting input of the Op amp A4. The node N10 is electrically connected to the other end of the resistor R6, one end of the resistor R7 and a non-inverting input of the Op amp A4. The node N11 is electrically connected to the output of the Op amp A4, the other end of the resistor R5 and the input of an Analog Digital converter (hereinafter called "AD converter"). The node N12 is electrically connected to the other end of the resistor R7, the output of the Op amp A3 and an inverting input of the Op amp A3. The node N13 is electrically connected to a non-inverting input of the Op amp A3, one analog input/output of the analog switch S3 and one analog input/output of the analog switch S4. The node N16 is electrically connected to the other analog input/output of the analog switch S3, one end of the resistor R8 and one end of the resistor R9. The node N14 is electrically connected to the other end of the resistor R9. The node N14 is supplied with a source potential VDD. The node N15 is electrically connected to the other end of the resistor R8 and the other analog input/output of the analog switch S4. The node N15 is supplied with a ground potential GND.

A preamplifier unit is composed of the analog switches S1 and S2, the Op amps A1 and A2 and the resistors R1 through R3. A level shifting unit is composed of the analog switches S3 and S4, the Op amps A3 and A4, the resistors R4 through R8 and the variable resistor R9.

The ratio among resistance values of the resistors R1, R2, R3 and R4 will be defined as 1 : 1 : 1 : 1.

The variable resistor R9 serves so as to adjust a potential level at the node N16 and adjust a potential level at the node N13 when the analog switch S3 is turned on.

Operations of the offset cancel circuit according to the first embodiment and the offset cancel system using it will now be described.

The offset cancel circuit according to the first embodiment has two states of an input potential difference measurement mode and an offset measurement mode.

The operation of the offset cancel circuit in the input potential difference measurement mode will first be described.

<Input potential difference measurement mode>

When the offset cancel circuit is placed in the input potential difference measurement mode, the node N2 is set to an L level. Thus, the switches S1 and S4 are turned OFF and the switches S2 and S3 are turned ON.

At this time, a predetermined pressure is applied to the pressure sensor so that a potential difference $\Delta V$ is outputted. The small potential difference $\Delta V$ outputted from the pressure sensor is inputted between the nodes N1 and N3. If potentials at the nodes N1 and N3 are defined as VN1 and VN3 respectively, then the difference in potential therebetween $\Delta V$ is given by the following expression:

$$\Delta V = VN3 - VN1 \quad (expression\ 1)$$

The preamplifier unit amplifies the potential difference $\Delta V$ by $(R1+R2+R3)/R2$ times. The level shifting unit supplies a potential VN11 that meets the following relation, to the node N11 based on the amplified potential difference $(R1+R2+R3)/R2.\Delta V$ and a potential VN13 at the node N13.

$$VN11 = (R1+R2+R3)/R2.\Delta V + VN13 \quad (expression\ 2)$$

Here, the expression 2 is a theoretical expression at the time that it is assumed that no offset voltage appears between the non-inverting and inverting input terminals of each of the individual Op amps A1, A2, A3 and A4.

In practice, however, offset voltages VOFF1, VOFF2, VOFF3 and VOFF4 respectively exist between the non-inverting and inverting input terminals of the Op amps A1, A2, A3 and A4.

If the offset voltages are taken into account, then the expression (2) is rewritten as follows:

$$VN11 = (R1+R2+3)/R2.(\Delta V + VOFF1 - VOFF2) + VN13 + VOFF3 + 2.VOFF4 \quad (expression\ 3)$$

An error Vop (corresponding to a shift or displacement of the expression 3 from the expression 2) developed at the node N11 by the offset voltages of the individual Op amps is given by the following expression:

$$Vop = (R1+R2+R3)/R2.(VOFF1 - VOFF2) + VOFF3 + 2.VOFF4$$

The error Vop differs according to each product. Now, the VN13 can be set to a desired value. Thus, when the input potential difference inputted to each product is kept identical, the VN11 can be set to the same value between products by adjusting the VN13 in advance at each product.

However, the offset voltages vary according to temperatures, the source potential, etc. Thus, even when the same pressure is applied to the pressure sensor, the output potential VN11 varies according to the state of usage of a single product even in the cause of the single product.

Further, the pressure sensor also has an offset voltage. Thus, an error occurs even in the potential difference $\Delta V$ produced from the pressure sensor and the potential difference $\Delta V$ is shifted from an ideal value. Namely, assuming that when the pressure applied to the pressure sensor is of a given value, an ideal potential difference supplied between the input terminals IN1 and IN2 is defined as d and an output potential difference error caused by the offset voltage of the pressure sensor is defined as e, the following expression is given:

$$\Delta V = d + e$$

An output potential error Vp produced at the node N11 by the offset voltage of the pressure sensor is given by the following expression:

$$Vp = (R1+R2+R3)/R2.e$$

In order to cancel product-to-product shifts or displacements of the output potential errors (corresponding to the shift from the ideal value) produced at the node N11 by the offset voltage of each Op amp and the offset voltage of the pressure sensor, the offset measurement mode is set to the offset cancel circuit.

The operations of the offset cancel circuit and the offset cancel system at the time of its offset measurement mode will be described below.

<Offset measurement mode>

When the offset cancel circuit is placed in the offset measurement mode, the node N2 is brought to an H level. As a result, the analog switch S1 is turned ON, the analog switch S2 is turned OFF, the analog switch S3 is turned OFF and the analog switch S4 is turned ON. Thus, potentials equal to each other are inputted to the nodes N1 and N3 respectively. Namely, $\Delta V = 0$ in the expression 1. The ground potential GND is supplied to the node N13. At this time, an output potential VN11' supplied to the node N11 is given by the following expression:

$$VN11' = (R1+R2+R3)/R2.(VOFF1 - VOFF2) + VOFF3 + 2.VOFF4 \quad (expression\ 4)$$

The AD converter is supplied with the VN11 and performs AD conversion on the VN11. The AD converter outputs a value based on the VN11 to an arithmetic device. Further, the AD converter is inputted with the VN11' and performs AD conversion on the VN11'. The AD converter outputs a value based on the VN11' to the arithmetic device. The arithmetic device computes the difference between the two values outputted from the AD converter. For simplicity of illustration, the following description will be made on the assumption that an input ahead of its AD conversion and an output obtained after its AD conversion are equal to each other.

The difference between the potential VN11 (expression 3) and the potential VN11' (expression 4) both supplied to the node N11 is given by the following expression:

$$VN11 - VN11' = (R1+R2+R3)/R2.\Delta V + VN13 \quad (expression\ 5)$$

Thus, the error developed due to the offset voltage of each Op amp is canceled.

When $\Delta V = d + e$ is now substituted into the expression 5, the above difference is rewritten as follows:

$$VN11 - VN11' = (R1+R2\ R3)/R2.(d+e) + VN13$$

An output potential error Vp produced at the node N11 by the offset voltage of the pressure sensor is given by the following expression:

$$Vp = (R1+R2+R3)/R2.e$$

The offset voltage of the pressure sensor varies under the influence of temperatures and a source potential. However, the influence of the output potential difference error e developed due to the offset voltage of the pressure sensor on the temperatures and the source potential is known in advance. Thus, even when conditions given to the temperature and the source potential vary, a change in output potential VN11 due to their variations can be calculated by the arithmetic device. Therefore, such a change can be canceled.

Thus, when the same pressure is applied to the pressure sensor, the difference VN11-VN11' can be equally set between products by setting the VN13 to a desired value at each product. Namely, a shift in the error e at each product produced due to the offset voltage of the pressure sensor can be canceled.

In the first embodiment as described above, the potential at the node N13 is switched between the input potential difference measurement mode and the offset voltage measurement mode. Thus, the term of VN13 appears in the expression 5 indicative of the difference between the value (expression 3) measured under the input potential difference measurement mode and the value (expression 4) measured under the offset voltage measurement mode. Therefore, the difference VN11–VN11' can be set to a given value by adjusting and shifting the VN13 to the desired value at each product. As a result, the influence of the offset voltages of the Op amps and the shift developed at each product due to the offset voltage of the pressure sensor can be eliminated.

Figure 2:
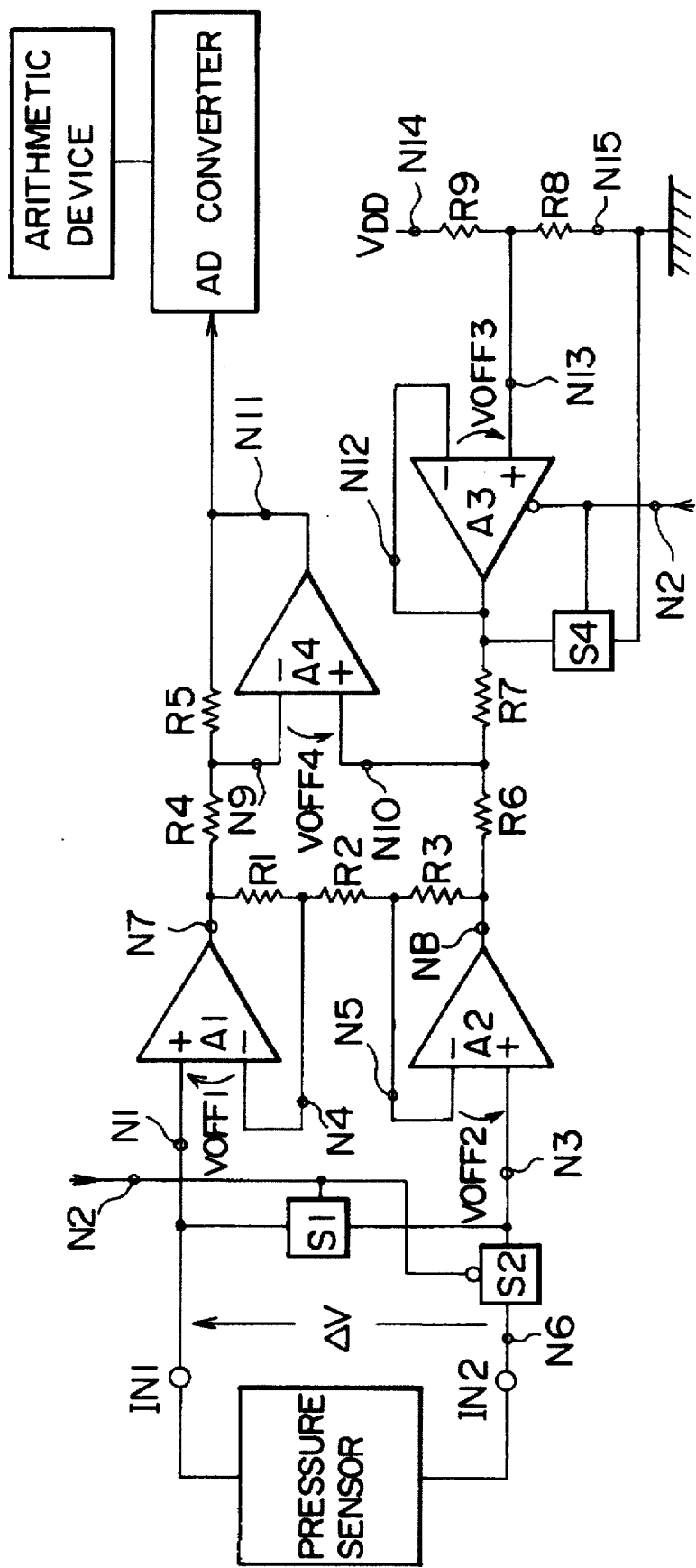
FIG. 2 is a view illustrating a circuit configuration of an offset cancel system including an offset cancel circuit according to a second embodiment of the present invention.

FIG. 2 is a circuit diagram showing an offset cancel system according to a second embodiment of the present invention.

The same elements of structure as those shown in FIG. 1 or the elements of structures similar to those shown in FIG. 1 are identified by like reference numerals and their description will therefore be omitted.

The analog switch S3 shown in FIG. 1 is omitted from the offset cancel system shown in FIG. 2. A node N13 is electrically connected to a non-inverting input of an Op amp A3 and one ends of resistors R8 and R9. A node N14 is electrically connected to the other end of the resistor R9 and a source potential VDD. A node N15 is electrically connected to the other end of the resistor R8, one analog input/output of an analog switch S4 and a ground potential GND. A node N12 is electrically connected to the other analog input/output of the analog switch S4, the output of the Op amp A3, an inverting input of the Op amp A3 and one terminal of a resistor R7. A control input of the analog switch S4 is electrically connected to a node N2. An output enable input OE of the Op amp A3 is electrically connected to the node N2.

The operation of the second embodiment will now be described.

<Input potential difference measurement mode>

The operation of the second embodiment placed in the input potential difference measurement mode is identical to that of the first embodiment. Thus, an output potential difference supplied to the node N11 is given by the expression 3.

<Offset measurement mode>

When the second embodiment is placed in the offset measurement mode, the node N2 is brought to an H level. Thus, the analog switch S4 is turned ON and the output of the Op amp A3 is disabled. The node N12 is supplied with a potential VN15 applied to the node N15. Accordingly, the expression 4 is rewritten as follows:

$$VN11'=(R1+R2+R3)/R2 \cdot (VOFF1-VOFF2)+VN15+2 \cdot VOFF3 \text{(expression 6)}$$

If the difference between the expression 3 and the expression 6 is taken, then the following expression is obtained:

$$VN11-VN11'=(R1+R2+R3)/R2 \cdot \Delta V+VOFF3+VN16-VN15 \text{(expression 7)}$$

Thus, the term of an error produced by an offset voltage of the Op amp A3 remains.

According to the second embodiment as described above, the term of the error produced by the offset voltage of the Op amp A3 is left on the above expression. Since, however, the Op amp A3 is disabled when the second embodiment is placed in the offset measurement mode, an advantage can be brought about that the current to be consumed by the Op amp A3 can be set to zero.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An offset cancel circuit comprising:

two input nodes to which first and second potentials are supplied in a first period from a device having an offset voltage, and to which third and fourth potentials are supplied in a second period, the first potential differing from the second potential, the third potential being substantially the same as the fourth potential;

an output node;

an amplifier circuit having inputs and outputs, the inputs of said amplifier circuit being electrically coupled to said two input nodes, said amplifier circuit providing fifth and sixth potentials in the first period in response to the first and second potentials, said amplifier circuit providing seventh and eighth potentials in the second period in response to the third and fourth potentials; and a level shifting unit having inputs, an output and a level shifting node, the inputs of said level shifting unit being electrically coupled to the outputs of said amplifier circuit, the output of said level shifting unit being electrically coupled to said output node, said level shifting unit supplying in the first period a ninth potential to the level shifting node in response to a first level of a mode changing signal, said level shifting unit supplying in the first period a tenth potential in response to the fifth, sixth and ninth potentials, said level shifting unit supplying in the second period an eleventh potential to the level shifting node in response to a second level of the mode changing signal, said level shifting unit outputting in the second period a twelfth potential in response to the seventh, eighth and eleventh potentials, wherein the ninth potential differs from the eleventh potential.

2. An offset cancel circuit according to claim 1 further comprising a switching circuit electrically coupling said two input nodes in the second period, wherein a potential difference of said two input nodes is substantially set in the second period to "0" by said switching circuit.

3. An offset cancel system comprising:

two input nodes to which first and second potentials are supplied in a first period from a device having an offset voltage, and to which third and fourth potentials are supplied in a second period, the first potential differing from the second potential, the third potential being substantially the same as the fourth potential;

an output node;

an amplifier circuit having inputs and outputs, the inputs of said amplifier circuit being electrically coupled to said two input nodes, said amplifier circuit providing fifth and sixth potentials in the first period in response to the first and second potentials, said amplifier circuit providing seventh and eighth potentials in the second period in response to the third and fourth potentials;

a level shifting unit having inputs, an output and a level shifting node, the inputs of said level shifting unit being electrically coupled to the outputs of said amplifier circuit, the output of said level shifting unit being electrically coupled to said output node, said level shifting unit supplying in the first period a ninth potential to the level shifting node in response to a first level of a mode changing signal, said level shifting unit providing in the first period a tenth potential in response to the fifth, sixth and ninth potentials, said level shifting unit supplying in the second period an eleventh potential to the level shifting node in response to a second level of the mode changing signal, said level shifting unit providing in the second period a twelfth potential in response to the seventh, eighth and eleventh potentials, wherein the ninth potential differs from the eleventh potential; and an AD converter electrically connected to said output node for outputting a first value in response to the tenth potential and outputting a second value in response to the twelfth potential, an arithmetic device being electrically connected to the AD converter for performing computation in response to the first and second value.

4. An offset cancel system according to claim 3 further comprising a switching circuit electrically coupling said two input nodes in the second period, wherein a potential difference of said two input nodes is substantially set in the second period to "0" by said switching circuit.

5. A method for adjusting an offset voltage, comprising the steps of:

supplying in a first period first and second potentials provided from a device having an offset voltage to inputs of an amplifier circuit, said first potential differing from said second potential;

outputting in the first period third and fourth potentials in response to said first and second potentials by said amplifier circuit;

supplying in the first period a fifth potential to a level shifting node of a level shifting unit in response to a first level of a mode changing signal by said level shifting unit;

outputting in the first period a sixth potential in response to said third, fourth and fifth potentials by said level shifting unit;

supplying in a second period seventh and eighth potentials to said inputs of said amplifier circuit, said seventh potential being substantially the same as said eighth potential;

outputting in the second period ninth and tenth potentials in response to said seventh and eighth potentials by the amplifier circuit;

supplying in the second period an eleventh potential to said level shifting node of said level shifting unit in response to a second level of the mode changing signal by said level shifting unit, said fifth potential differing from said eleventh potential;

outputting in the second period a twelfth potential in response to said ninth, tenth and eleventh potentials by said level shifting unit;

outputting a first value in response to said sixth potential and outputting a second value in response to said twelfth potential; and performing a computation in response to said first and second values.

* * * * *